(12) United States Patent
Bateman (10) Patent No.: US 8,811,542 B2
(45) Date of Patent: Aug. 19, 2014

(54) HDX DEMODULATOR

(75) Inventor: Leigh Bateman, Jandowae (AU)

(73) Assignee: Aleis Pty Ltd., Jandowae, Queensland (AU)

( * ) Notice: Subject to any disclaimer, the term of this patent is extended or adjusted under 35 U.S.C. 154(b) by 0 days.

(21) Appl. No.: 12/902,910

(22) Filed: Oct. 12, 2010

(65) Prior Publication Data

US 2011/0210823 A1   Sep. 1, 2011

Related U.S. Application Data

(60) Provisional application No. 61/250,407, filed on Oct. 9, 2009.

(51) Int. Cl.
*H04L 27/14* (2006.01)
(52) U.S. Cl.
USPC .......................................... 375/334; 375/340
(58) Field of Classification Search
CPC .......... H04B 1/26; H04L 27/00; H04L 27/14; H04L 27/2334; H04L 2025/03394
USPC ........................... 340/10.1; 375/334, 350, 340
See application file for complete search history.

(56) References Cited

U.S. PATENT DOCUMENTS

| | | |
|---|---|---|
| 1,744,036 A | 1/1930 | Brard |
| 2,350,337 A | 6/1944 | Brunner |
| 3,299,424 A | 1/1967 | Vinding |
| 3,713,146 A | 1/1973 | Carroll et al. |
| 3,713,148 A | 1/1973 | Cardullo et al. |
| 3,995,234 A | 11/1976 | Tuccinardi |
| 4,251,808 A | 2/1981 | Lichtblau |
| 4,551,712 A | 11/1985 | Fockens |
| 4,751,516 A | 6/1988 | Lichtblau |
| 4,776,040 A * | 10/1988 | Ichikawa et al. .............. 455/315 |
| 4,795,995 A | 1/1989 | Eccleston et al. |
| 4,999,641 A | 3/1991 | Cordery et al. |
| 5,053,774 A | 10/1991 | Schuermann et al. |
| 5,103,235 A | 4/1992 | Clemens |
| 5,168,282 A | 12/1992 | Viereck |
| 5,218,343 A | 6/1993 | Stobbe et al. |

(Continued)

FOREIGN PATENT DOCUMENTS

| | | |
|---|---|---|
| EP | 0783158 | 4/2004 |
| WO | 03/085617 | 10/2003 |
| WO | 2011044585 A1 | 4/2011 |
| WO | 2011056891 A1 | 5/2011 |

OTHER PUBLICATIONS

International Search Report for International Application No. PCT/US2009/056110, date completed Oct. 21, 2009, date mailed Oct. 29, 2009, 3 pgs.

(Continued)

*Primary Examiner* — Shuwang Liu
*Assistant Examiner* — David S Huang
(74) *Attorney, Agent, or Firm* — KPPB LLP (57) ABSTRACT

Low noise mixers for use in RFID readers and RFID readers configured to receive data from ISO HDX transponders in accordance with embodiments of the invention are illustrated. One embodiment of the invention receives the HDX FSK signal using a resonant antenna, upwardly mixes the FSK signal to an intermediate frequency, filters the intermediate frequency FSK signal using at least one ceramic bandpass filter, and demodulates the filtered intermediate frequency FSK signal to produce a binary output.

12 Claims, 8 Drawing Sheets

(56) References Cited

U.S. PATENT DOCUMENTS

| | | | |
|---|---|---|---|
| 5,289,199 | A | 2/1994 | Viereck |
| 5,289,500 | A | 2/1994 | Inou et al. |
| 5,302,954 | A | 4/1994 | Brooks et al. |
| 5,349,649 | A | 9/1994 | Iijima |
| 5,451,958 | A * | 9/1995 | Schuermann ............ 342/42 |
| 5,517,194 | A | 5/1996 | Carroll et al. |
| 5,530,232 | A | 6/1996 | Taylor |
| 5,602,744 | A | 2/1997 | Meet et al. |
| 5,649,295 | A | 7/1997 | Vannucci et al. |
| 5,914,692 | A | 6/1999 | Bowers et al. |
| 5,952,935 | A * | 9/1999 | Mejia et al. ............ 340/10.3 |
| 5,963,173 | A | 10/1999 | Lian et al. |
| D416,883 | S | 11/1999 | Wanger et al. |
| 6,137,447 | A | 10/2000 | Saitoh et al. |
| 6,249,212 | B1 | 6/2001 | Beigel et al. |
| 6,353,406 | B1 * | 3/2002 | Lanzl et al. ............. 342/118 |
| 6,434,194 | B1 * | 8/2002 | Eisenberg et al. ....... 375/238 |
| 6,913,201 | B1 | 7/2005 | Wagner et al. |
| 7,028,638 | B2 | 4/2006 | Bonsall |
| 7,197,279 | B2 | 3/2007 | Bellantoni |
| 7,299,029 | B2 * | 11/2007 | Elder et al. ............. 455/333 |
| 7,307,529 | B2 | 12/2007 | Gutnik et al. |
| 7,323,977 | B2 | 1/2008 | Kodukula et al. |
| 7,353,997 | B2 | 4/2008 | Tikhov et al. |
| 7,528,725 | B2 | 5/2009 | Stewart |
| 7,936,272 | B2 | 5/2011 | Stewart |
| 8,493,185 | B2 | 7/2013 | Bateman |
| 2001/0048361 | A1 | 12/2001 | Mays et al. |
| 2003/0132846 | A1 | 7/2003 | Hilliard |
| 2004/0134991 | A1 | 7/2004 | Fletcher et al. |
| 2004/0192223 | A1 | 9/2004 | Gardenfors et al. |
| 2005/0099269 | A1 | 5/2005 | Diorio et al. |
| 2005/0162276 | A1 | 7/2005 | Balch et al. |
| 2006/0261928 | A1 * | 11/2006 | Solberg et al. ........... 340/10.4 |
| 2006/0279406 | A1 * | 12/2006 | Stewart et al. ........... 340/10.1 |
| 2007/0013483 | A1 | 1/2007 | Stewart |
| 2007/0046369 | A1 | 3/2007 | Schober et al. |
| 2007/0057797 | A1 | 3/2007 | Waldner et al. |
| 2007/0096875 | A1 | 5/2007 | Waterhouse et al. |
| 2007/0207732 | A1 | 9/2007 | Rofougaran et al. |
| 2007/0276294 | A1 | 11/2007 | Gupta et al. |
| 2008/0012712 | A1 | 1/2008 | Shimizu |
| 2008/0150689 | A1 | 6/2008 | Chiu et al. |
| 2008/0218314 | A1 | 9/2008 | Eeden |
| 2008/0280581 | A1 | 11/2008 | Rofougaran et al. |
| 2009/0207027 | A1 | 8/2009 | Banerjee et al. |
| 2011/0205026 | A1 | 8/2011 | Bateman |
| 2011/0210824 | A1 | 9/2011 | Stewart |

OTHER PUBLICATIONS

Written Opinion of the International Searching Authority for International Application No. PCT/US2009/056110, date completed Oct. 21, 2009, date mailed Oct. 29, 2009, 8 pgs.

"International Standard—ISO 11784—Radio-frequency identification of animals—Code structure", Aug. 15, 1996, second edition, 5 pgs.

"International Standard—ISO 11785—Radio-frequency identification of animals—Technical concept", ISO 11785, Oct. 15, 1996, First edition, 20 pgs.

"Investigating the Effect of Acoustic/Mechanical Interference on Radio Frequency Identity (RFID) Systems Using to Identify Animals Electronically", May 2007-Jul. 2007, Tender Reference: CR/2007/01, 13 pgs.

Barnhardt et al., "Trainer-Mounted RFID Reader Scans EID Tags During Cattle Shipments", Kansas State University Report of Progress 978, Beef Cattle Research, 2007, Title page, pp. 22-24.

International Search Report and Written Opinion for International Application No. PCT/US2009/056110, date completed Oct. 21, 2009, date mailed Oct. 29, 2009, 11 pgs.

* cited by examiner

Fig 3 Prior Art
ISO HDX Transponder
Modulation Scheme

Fig. 10

HDX DEMODULATOR

CROSS REFERENCE TO RELATED APPLICATIONS

This application claims priority to U.S. Provisional Application Ser. No. 61/250,407 filed Oct. 9, 2009, the entirety of which is incorporated herein by reference.

FIELD OF THE INVENTION

The invention relates to radio frequency identification (RFID) systems, and more particularly to low frequency RFID systems of the half-duplex (HDX) type that use frequency shift keying (FSK) modulation for transmitting ID code data.

BACKGROUND

Government interest in RFID animal identification developed in the late 1980's with the formation of the European Union and ensuing concerns about potentially uncontrolled transport of animals across international borders. In response, the International Standards Organization was chartered in the early 1990's with developing an international standard based on one or more of the existing RFID technologies, with the intent of identifying all livestock with RFID tags. A practicable and operable international identification system requires a standard RFID system, rather than a proliferation of the multiple mutually incompatible proprietary systems. After several years of research, investigation, and negotiation, ISO published Standards 11784 and 11785.

ISO Standard 11785 defines the technical principles for communications between interrogators (alternately referred to as "readers" or "scanners") and two types of electronic passive identification transponders, and ISO 11784 defines the allocation of transponder memory bits for identification purposes. These transponders contain identification information stored in binary form, which is conveyed to the interrogator when a transponder is suitably activated by the interrogator. Additional technical details are provided in ISO Standards 11784 and 11785, the disclosure of which is incorporated into this disclosure by reference in its entirety.

Passive low frequency RFID interrogators and tags use operating principles that are well-know to those of ordinary skill in the art, and that are described in extensive detail in several seminal inventions, including U.S. Pat. No. 1,744,036 (Brard—1930), U.S. Pat. No. 3,299,424 (Vinding—1967), U.S. Pat. No. 3,713,146 (Cardullo—1973), and U.S. Pat. No. 5,053,774 (Schuermann—1991), and in textbooks such as "RFID Handbook" (Finkenzeller—1999).

Figure 1:
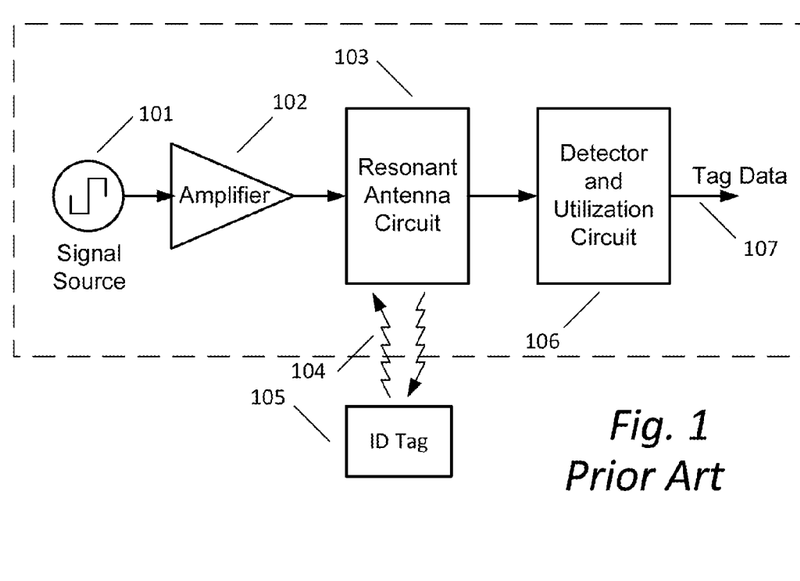
FIG. 1 illustrates the basic components of a conventional passive RFID system.

As depicted in FIG. 1, the interrogator 100 includes electronic circuitry, which generates an activation signal (usually a single frequency unmodulated sinusoidal signal) using a signal source 101 and an amplifier 102 to drive a resonant antenna circuit 103. This activation signal manifests as a time-varying electromagnetic field, which couples with the ID tag 105 by means of the electromagnetic field's magnetic field component 104. The ID tag 105 converts this magnetic field into an electrical voltage and current, and uses this electrical power to activate its internal electronic circuitry. Using any of several possible modulation schemes, the ID tag conveys binary encoded information stored within it back to the interrogator via a magnetic field 104, where the detector and utilization circuit 106 converts this binary code into typically decimal, hexadecimal, or alphanumeric format tag data 107 in accordance with some prescribed application.

ISO Standard 11785 defines two types of transponder technologies, which are designated "full-duplex" ("FDX-B") and "half-duplex" ("HDX"). In the described manners that follow, for HDX and FDX-B transponders, respectively, activation energy is transferred to the transponder from the interrogator, and identification code information is transferred to the interrogator from the transponder through the mutual coupling of a magnetic field.

The FDX-B transponder amplitude modulates the interrogator's activation signal with its binary identification code sequence. The interrogator detects this modulation and derives from it the FDX-B transponder's identification code. The term "full-duplex" derives from the FDX-B transponder's behavior wherein its identification code information is transmitted simultaneously during receipt of the activation signal from the interrogator.

In contrast, the HDX transponder uses the interrogator's activation signal to charge an internal capacitor (which functions as a very small rechargeable battery), and it uses this stored energy to activate a transmitter, which emits a frequency shift keyed ("FSK") signal representative of the transponder's identification code. Specifically, the binary identification code information contained in the HDX tag is serially output such that the occurrence of a binary "1" results in an ISO HDX tag's radio signal being 124.2 KHz and a binary "0" results in the tag's radio signal being 134.2 KHz. The interrogator detects this FSK signal and derives from it the HDX transponder's identification code. The term "half-duplex" derives from the HDX transponder's behavior wherein the exchange of the activation signal and the identification code signal occur during alternate time intervals.

Figure 2:
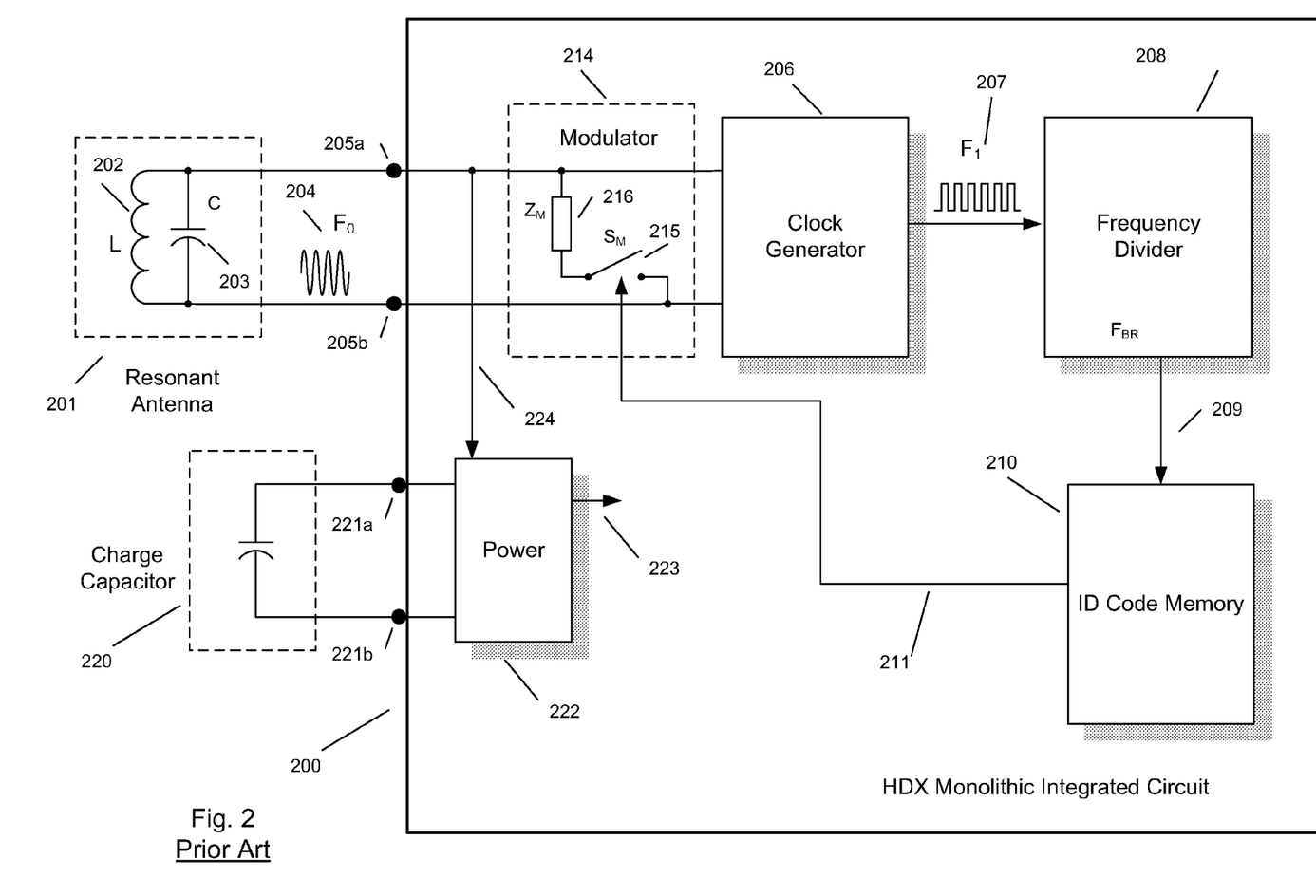
FIG. 2 illustrates the architecture and functional features of an ISO 11785 compliant HDX transponder.

FIG. 2 provides a block diagram illustration of an HDX identification tag. Referring to both the block diagram of FIG. 2 and the HDX waveforms of FIG. 3(c), an HDX tag receives an activation signal from the interrogator, which manifests as a 134.2 KHz sinusoidal voltage $F_O$ illustrated in FIG. 3(a) appearing across the terminals 205a, 205b of the Resonant Antenna Circuit 201. This voltage 224 is converted to direct current and powers a portion of tag circuitry 222 that controls the accumulation of electrical charge in a capacitor 220 and also holds the tag in a suspended communication state. When the HDX tag power control circuitry 222 has detected that the sinusoidal voltage $F_O$ has diminished in amplitude, the HDX tag enters its transmission active state by supplying voltage 223 to internal circuitry.

Figure 3:
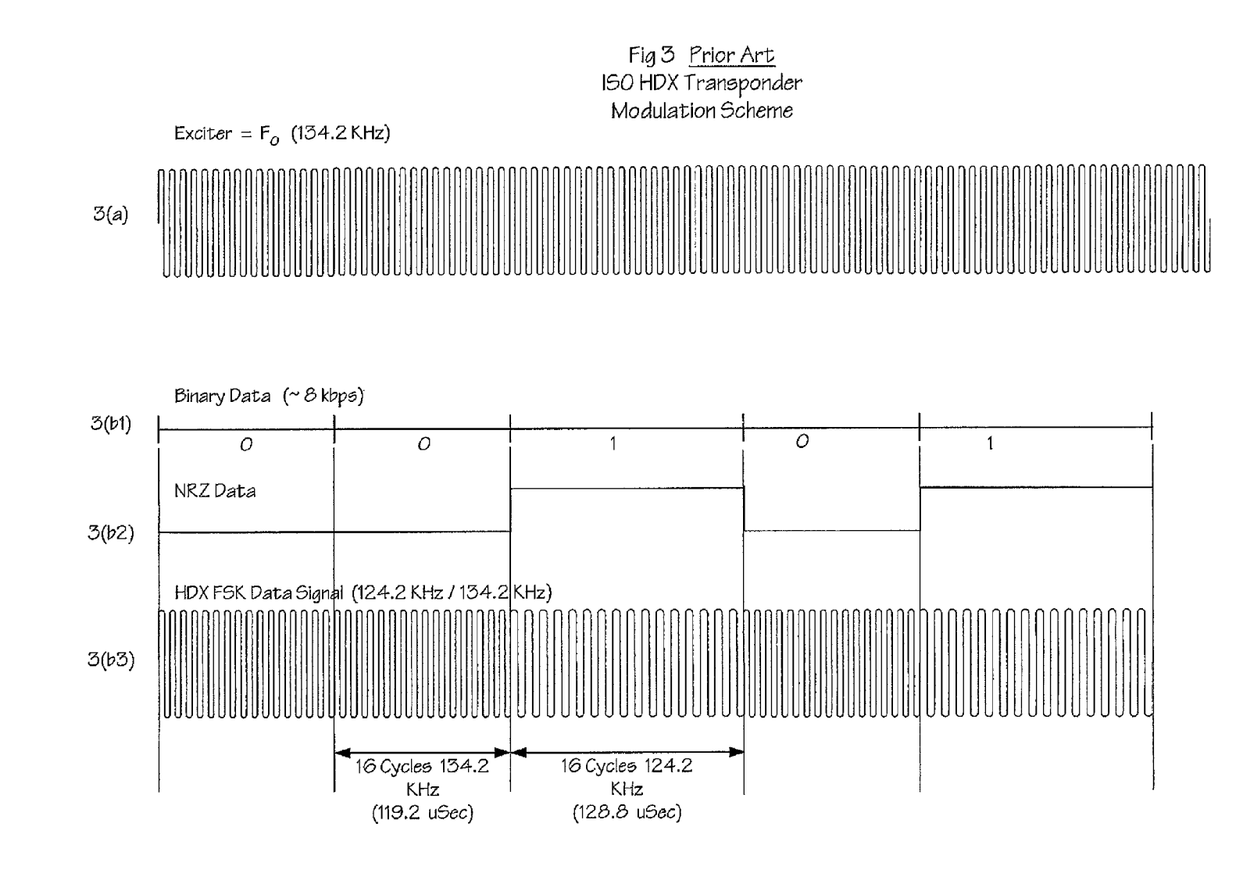

The Clock Generator 206 in the HDX tag, in conjunction with the Resonant Antenna Circuit 201 includes a ringing oscillator, that continues to oscillate at its natural frequency, (which is approximately the same as the activation signal frequency $F_O$), when $F_O$ 204 ceases. A ringing oscillator operates in a manner very much like a musical instrument's string, which is periodically plucked so that is remains oscillating. Such a ringing oscillator is disclosed in U.S. Pat. No. 3,995,234, the disclosure of which is incorporated herein by reference in its entirety. The oscillator output $F_1$ 207 is applied to the frequency divider which reduces $F_1$ 207 by a factor of 16, which in turn becomes signal $F_{BR}$ 209 having approximate frequency 8387 Hz. This frequency establishes the bit rate of the tag, and it is used to clock Binary Data 211 out of the ID Code Memory 210, wherein the Binary Data 211 resides as a sequence of binary 1's and 0's (see for example FIGS. 3(b1), 3(b2)). In other words, for every 16 input pulses of $F_1$ 207, a new identification code Binary Data bit is output from the ID Code Memory 210.

Binary 1's and 0's, such as the NRZ binary data illustrated in FIGS. 3(b1), 3(b2), are clocked out of the ID Code Memory 210 so that Binary Data 211, is applied directly to Modulation Switch $S_M$ 215. Switch $S_M$ 215 opens and closes in response to the binary 0's and 1's, respectively. In an HDX transponder, Load Impedance $Z_M$ 216 is typically a capacitive element that is connected across the Resonant Antenna 201 when switch $S_M$ 215 closes in response to a binary 1. This capacitor $Z_M$ 216 has the effect of altering the effective resonant frequency of the Resonant Antenna 201 thereby altering the operating frequency of the ringing oscillator to 124.2 KHz. Consequently, the oscillator output $F_1$ 207 becomes 124.2 KHz, which is reduced by a factor of 16 by the Frequency Divider 208 to produce the signal $F_{BR}$ 209 having the approximate frequency 7762 Hz. The ringing oscillator changes its frequency between 134.2 KHz and 124.2 KHz in response to binary 0's and 1's, thus creating a frequency shift keyed (FSK) sinusoidal signal (see for example FIG. 3c) that appears across the resonant antenna circuit 201. As can be seen from FIG. 3c, the period of a binary 1 is greater (about 129 μsec) than the period of a binary 0 (about 119 μsec), since the bit rate is determined by dividing the ringing oscillator's instantaneous frequency (either 134.2 KHz or 124.2 KHz) by 16.

Figure 4:
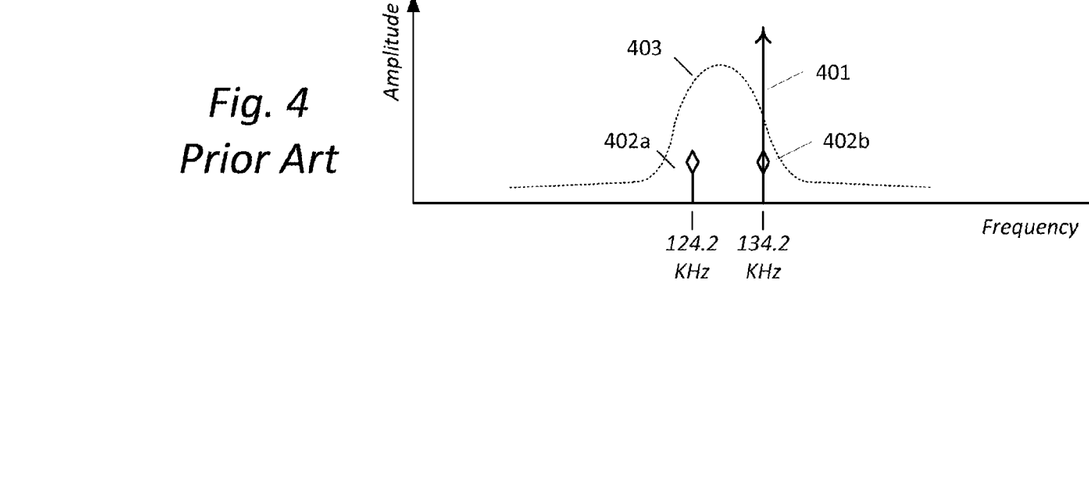
FIG. 4 illustrates signal frequency spectra associated with an activation signal and FSK signals transmitted by an ISO HDX transponder.

FIG. 4 illustrates the spectra for the HDX tag, where the activation signal 401 appears at 134.2 KHz, and where the HDX transponder frequencies appear at 124.2 KHz 402a and 134.2 KHz 402b. Since the activation signal 401 and the HDX transponder signals 402a, and 402b alternate in time, the 134.2 KHz activation signal 401 and the 134.2 KHz transponder signal 402a, and 402b do not occur simultaneously. Thus, the interrogator's receive circuitry is able to detect the transponder data signal without being interfered with by its own activation signal. The frequency response 403 of a resonant antenna configured to detect FSK data transmitted by an HDX tag is also illustrated in FIG. 4.

Figure 5:
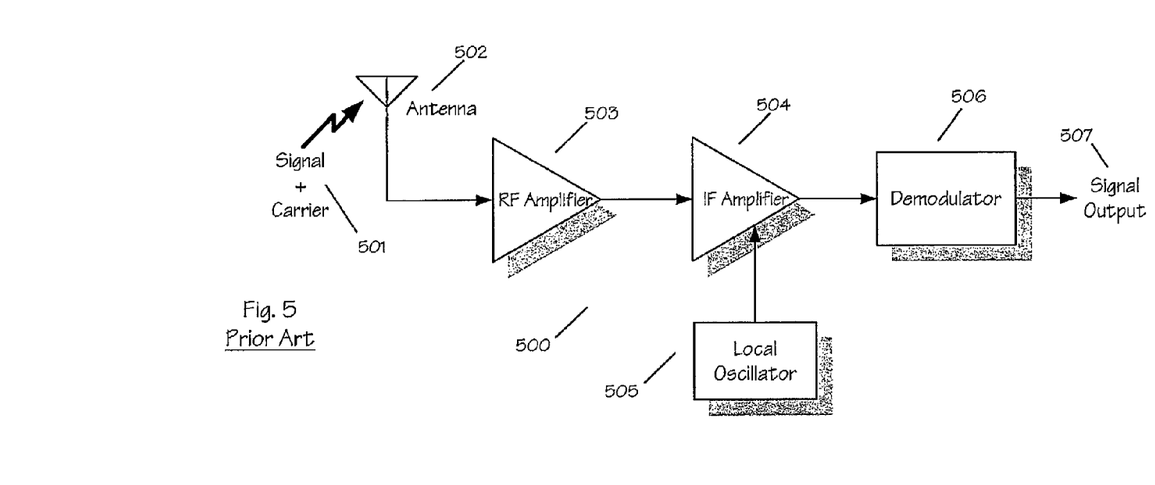
FIG. 5 illustrates a prior art RFID reader circuit for demodulating ISO HDX FSK modulated data by down mixing the received signal to an intermediate frequency.

Previous implementations of HDX receive circuits have used components that were manually tuned. For example, a typical FSK receiver down converts the received data signal to an intermediate frequency by mixing the received data signal using a mixer tuned to a frequency slightly above or below the carrier frequency. An RFID reader 500 that utilizes an architecture similar to that of a superheterodyne receiver, involving the use of a local oscillator to down-mix an FSK modulated HDX signal to an intermediate frequency is illustrated in FIG. 5. An FSK signal modulated onto a carrier 501 is received via a resonant antenna 502 and is provided to an RF amplifier 505 before mixing the received signal to an intermediate frequency using an IF amplifier 504 and a local oscillator 505. The data is then demodulated using a demodulator 506 and the demodulated data 507 is output. Tuning of the local oscillator can be critical to the operation of the RFID reader circuit illustrated in FIG. 5 as shifts in the frequency of the local oscillator relative to the frequency of the carrier can result in the reversal of the logic levels in the demodulated data depending upon whether the local oscillator is tuned to a frequency above or below the carrier frequency.

Figure 6:
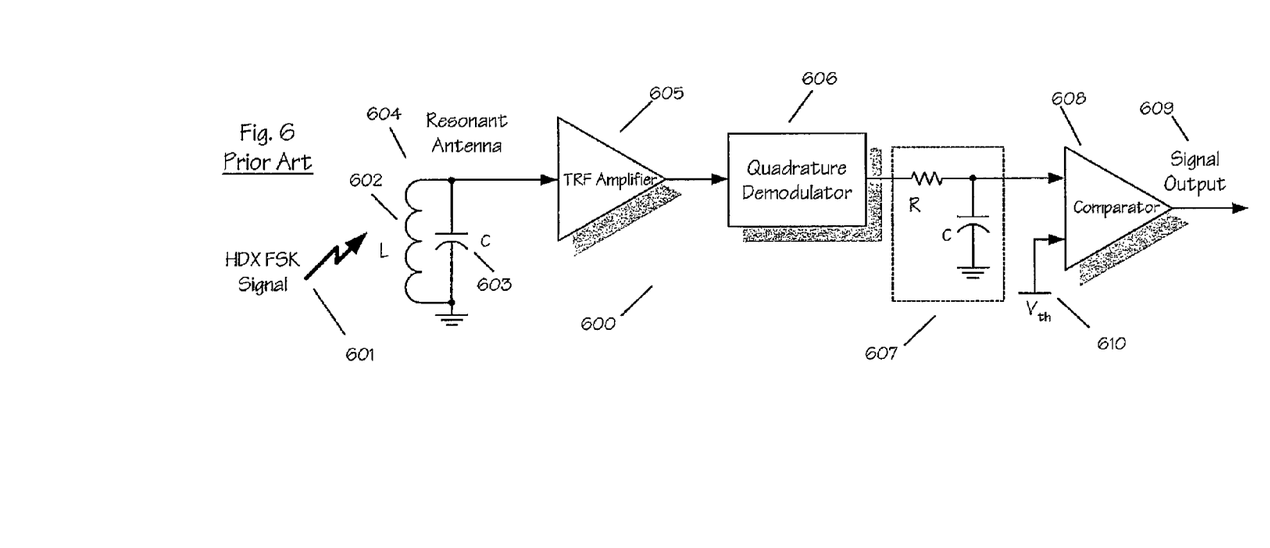
FIG. 6 illustrates another prior art RFID reader circuit for demodulating ISO HDX FSK modulated data using a quadrature demodulator.

Previous implementations have also commonly used quadrature demodulators that create an analog output level proportional to frequency. This type of circuit uses a manually tunable inductor to set the centre frequency. Additional circuitry such as an Analog to Digital (A/D) converter or a comparator can be used to extract modulation data. An RFID reader 600 including a quadrature demodulator is shown in FIG. 6. The HDX FSK signal 601 is received using a resonant antenna 604 including an inductive 602 and a capacitive 603 component. The received signal is provided to a tuned radio frequency amplifier 605 and then to a quadrature demodulator 604, which outputs a pulse width modulated signal as a function of the FSK frequency. The output of the quadrature demodulator is provided to a filter network 607 that averages the pulse width variations such that the two FSK frequencies produce different voltage levels. A comparator 606 compares the output of the filter network 604 to a threshold voltage 610 to produce an output data signal 608, which is a binary signal. While FIG. 6 shows a quarature demodulator 606 used for FSK demodulation, alternate methods involving a phase locked loop (PLL), ratio detector, discriminator, and/or a pulse counter can also be utilized in the demodulation of FSK signals.

While the TRF receiver architecture illustrated in FIG. 6 is effective and economical, its principal disadvantage is its poor selectivity. Its bandwidth and susceptibility to radio frequency signals is limited by the characteristics of the resonant antenna circuit, and by the bandwidth of the TRF amplifier. The TRF amplifier may have one or two filter networks including fixed value or adjustable components, that provide modest rejection of nearby radio frequency interference signals. However, RF signals from electronic devices such as variable speed motor drive controllers, power inverters, LCD screen backlights, and proportional cycle AC controllers can introduce disruptive interference, despite being outside the HDX FSK bandwidth, because the TRF receiver lacks sufficient signal selectivity (or sufficient out-of-band signal rejection).

While it is technically possible to improve the TRF receiver's selectivity by increasing the complexity and sophistication of filters associated with the TRF amplifier, in practice this becomes expensive, difficult, and unreliable. Such filters typically require precision tuning and alignment at the point of manufacture, and thereafter would be susceptible to drift due to aging and environmental influences. Therefore, what is needed is an improved receiver design that possesses improved selectivity, while being economical and having long-term stability and reliability.

SUMMARY OF THE INVENTION

Systems and methods in accordance with embodiments of the invention upwardly mix an FSK signal generated by an HDX transponder for filtering by at least one ceramic bandpass filter to attenuate environmental noise prior to demodulation. While the present invention can be used in RFID readers that incorporate both types of RFID technologies disclosed in ISO 11785, the invention is primarily directed at the ISO 11785 technology known as half-duplex (HDX) and other transponders that utilize low frequency FSK modulation.

It is the objective of the present invention to provide an improvement in the design and performance of a low frequency RFID receiver, such that electrical and radio frequency noise interference in adjacent frequency bands is more effectively rejected, thereby improving the reading distance and reading reliability of HDX transponders. Another objective of the present invention is to provide this improved design using standard commercially available and inexpensive components. Yet further objectives of the present invention are to provide an improved RFID receiver that requires no tuning or alignment during manufacture or use, that possesses excellent stability over time and with changing environmental conditions, and that is economical in total component and manufacturing costs.

One embodiment of the invention includes receiving the HDX FSK signal using a resonant antenna, upwardly mixing the FSK signal to an intermediate frequency, filtering the intermediate frequency FSK signal using at least one ceramic bandpass filter, and demodulating the filtered intermediate frequency FSK signal to produce a binary output.

In a further embodiment, upwardly mixing the FSK signal to an intermediate frequency comprises mixing the FSK signal with a local oscillator frequency.

In another embodiment, filtering the intermediate frequency FSK signal using at least one ceramic bandpass filter includes filtering the intermediate frequency FSK signal using a first ceramic bandpass filter, providing the filtered signal to a first intermediate frequency amplifier, filtering the output of the first intermediate frequency amplifier with a second ceramic bandpass filter, and providing the output of the second ceramic bandpass filter to a second intermediate frequency amplifier.

In a yet further embodiment, demodulating the filtered intermediate frequency FSK signal to produce a binary output includes reducing the frequency of the filtered intermediate frequency FSK signal using a frequency divider, and providing the reduced frequency filtered FSK signal to a microcontroller configured to demodulate the reduced frequency FSK signal and detect binary data.

In yet another embodiment, the HDX FSK frequencies are 134.2 KHz and 124.2 KHz.

In a still further embodiment, the HDX FSK frequencies are upwardly mixed to a center frequency of 450 KHz.

In still another embodiment, the at least one ceramic bandpass filter has a 6 dB width of at least +/−10 KHz on either side of the center frequency of the intermediate frequency signal.

In a further embodiment again, the at least one ceramic bandpass filter has a 6 dB width of at least +/−13 KHz on either side of the center frequency of the intermediate frequency signal.

In another embodiment again, the at least one ceramic bandpass filter has a 6 dB width of +/−13 KHz on either side of the center frequency of the intermediate frequency signal.

A further additional embodiment includes a resonant antenna configured to receive an FSK signal from an HDX transponder, a mixer configured to upwardly mix an FSK signal received via the resonant antenna to an intermediate frequency, at least one ceramic filter configured to bandpass filter the intermediate frequency FSK signal, at least one intermediate frequency amplifier configured to amplify the filtered frequency intermediate FSK signal, and a demodulator configured to demodulate the filtered intermediate frequency FSK signal and detect binary data.

In another additional embodiment, a first ceramic filter is configured to receive an intermediate frequency signal from the mixer, where the first ceramic filter includes an output connected to the input of a first intermediate frequency amplifier, a second ceramic filter is configured to receive an intermediate frequency signal from the first intermediate frequency amplifier, where the second ceramic filter includes an output connected to the input of a second intermediate frequency amplifier, and the second intermediate frequency amplifier is configured to provide the filtered intermediate frequency FSK signal to the demodulator.

In a still yet further embodiment, the demodulator includes a microcontroller, and a frequency divider configured to reduce the frequency of the FSK demodulator to a lower intermediate frequency and to provide the lower intermediate frequency FSK signal to the microcontroller. In addition, the microcontroller is configured to demodulate the lower intermediate frequency FSK signal to detect binary data, and the mixer is configured to use a local oscillator frequency generated using the microcontroller to upwardly mix the FSK signal received via the resonant antenna.

In still yet another embodiment, the resonant antenna is configured to receive HDX FSK frequencies of 134.2 KHz and 124.2 KHz.

In a still further embodiment again, the HDX FSK frequencies are upwardly mixed to a center frequency of 450 KHz.

In still another embodiment again, the at least one ceramic filter has a 6 dB width of at least +/−10 KHz on either side of the center frequency of the intermediate frequency signal.

In a still further additional embodiment, the at least one ceramic filter has a 6 dB width of at least +/−13 KHz on either side of the center frequency of the intermediate frequency signal.

In still another additional embodiment, the at least one ceramic filter has a 6 dB width of +/−13 KHz on either side of the center frequency of the intermediate frequency signal.

BRIEF DESCRIPTION OF THE FIGURES

FIGS. 3($a$) through 3($b$3) illustrate signal waveforms used to activate an ISO HDX transponder, and signal waveforms associated with the FSK signal transmitted by an ISO HDX transponder.

FIG. 9($a$) illustrates a low noise mixer that can be incorporated into an RFID reader circuit to mix a received ISO HDX FSK signal to an intermediate frequency and bandpass filter the signal using ceramic filters in accordance with an embodiment of the invention.

FIG. 9($b$) illustrates an RFID reader incorporating the low noise mixer illustrated in FIG. 9($a$) in accordance with an embodiment of the invention.

FIGS. 11($a$) through 11($e$) illustrate binary data modulated onto a carrier using FSK by an ISO HDX transponder, the mixing of the modulated data to an intermediate frequency utilizing a low noise mixer and the generation of a lower frequency signal for provision to a microcontroller using a frequency divider in accordance with various embodiments of the invention.

DETAILED DESCRIPTION OF THE INVENTION

Turning now to the drawings, low noise mixers for use in RFID readers and RFID readers configured to receive data from ISO HDX transponders in accordance with embodiments of the invention are illustrated. In many embodiments, the low noise mixer upwardly mixes an incoming radio frequency signal to a common intermediate frequency such as 450 or 455 KHz for filtering by at least one ceramic filter to band limit the resulting intermediate frequency and to exclude noise from near field sources. In a number of embodiments, the output of the low noise mixer is provided to a frequency divider so that the signal can be provided to a microcontroller for data detection. Processes for demodulating HDX FSK signals, low noise mixers, and RFID readers in accordance with embodiments of the invention are discussed further below.

Detecting ISO HDX FSK Modulated Data

Figure 7:
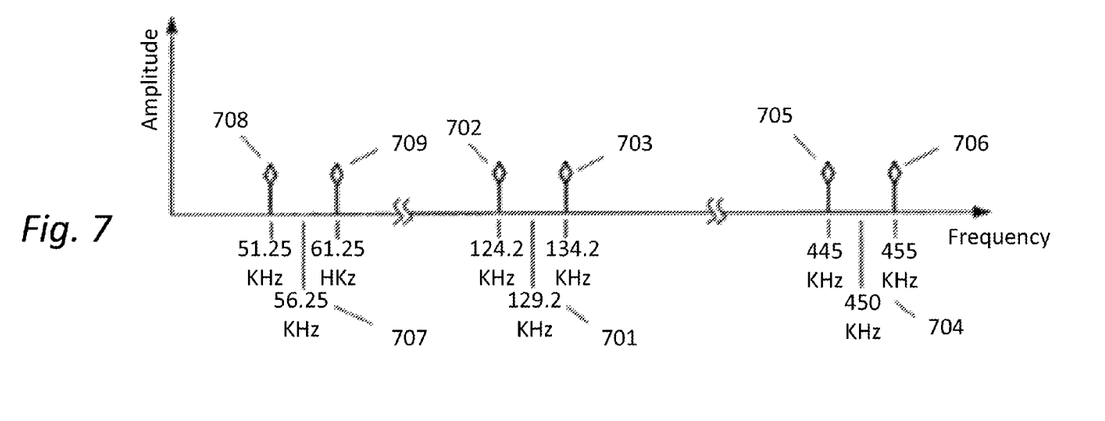
FIG. 7 conceptually illustrates a process of decoding an FSK signal by upwardly mixing the FSK signal and filtering the IF signal prior to detection of the data at a lower frequency using a microcontroller in accordance with an embodiment of the invention.

A process of detecting ISO HDX FSK modulated data in accordance with an embodiment of the invention is conceptually illustrated in FIG. 7. The process involves receiving an FSK data signal 701 that shifts frequency between 124.2 KHz (702) and 134.2 KHz (703) and upwardly mixing the FSK data signal to an intermediate frequency 704. In the illustrated embodiment, the FSK data signal is upwardly mixed to 450 KHz and the modulated data shifts frequency between 445 KHz (705) and 455 KHz (706). An advantage of upwardly mixing to an intermediate frequency is that signals at the higher intermediate frequency can be filtered using conventional ceramic bandpass filters, which are typically higher quality than passive filters. Because the modulating data rate is approximately 8 KHz, the signal spectra occupies a region that extends approximately 8 KHz beyond the FSK frequencies (702), and (703). Consequently, a bandpass filter with a bandwidth of nominally +/−13 KHz provides very high levels of environmental noise attenuation, although filters with slightly less or more bandwidth may prove suitable in some embodiments of the invention.

Ceramic filters, based on piezo-electric physics, are electro-mechanical devices that possess bandpass frequency resonant properties. While it is technically feasible to utilize ceramic filters having lower center frequencies in circuits similar to the circuit illustrated in FIG. 6, such a ceramic filter would be prohibitively expensive, large, and electrically lossy, and thus compromise the performance benefits attained. Therefore, translating the HDX FSK signal upward in frequency enables the use of inexpensive standard ceramic filters to improve the attenuation of noise from near field sources. Normally, the transformation of any electrical signal from one form or domain into another form or domain results in some loss of signal integrity and introduces undesirable noise, non-linearities, and/or harmonics, which result from the imperfect behavior of electronic devices. However, when heterodyning is used to upwardly mix an HDX FSK signal for filtering by a ceramic filter, the improvement in signal integrity resulting from the filtering of noise interference in adjacent frequency bands typically greatly exceeds any loss of integrity resulting from heterodyning. Consequently, the signal processing technique yields unanticipated benefits.

Upward heterodyning consists of mixing the HDX FSK frequencies with a local oscillator (LO) frequency source, which in order to translate the center frequency 129.2 KHz to the ceramic filter's 450 KHz center frequency, can be either 579.2 KHz or 320.8 KHz. Inasmuch as heterodyning produces the sum and difference frequencies of the two original frequencies, the following frequency combinations result:

LO=579.2 KHz LO+129.2 KHz=708.4 KHz

LO−129.2 KHz=450 KHz

LO=320.8 KHz LO+129.2 KHz=450 KHz

LO−129.2 KHz=191.6 KHz

In FIG. 7, the frequency spectra 704, 705, and 706 illustrate the difference frequency signals when the local oscillator is 579.2 KHz, or alternately, the summed frequency signals when the local oscillator is 320.8 KHz. For the purposes of the present invention, either local oscillator frequency is acceptable, although particular implementations of the invention may find one local oscillator frequency advantageous over the other.

Referring back to the process illustrated in FIG. 7, the intermediate frequency 704 can be filtered using at least one high quality ceramic band pass filter to attenuate noise from near field sources. Ceramic filters are typically low cost and have relatively good insertion loss due to their incorporation of high Q material. In many embodiments, multiple ceramic band pass filters can be cascaded to provide increased selectively. Ceramic filters that can be utilized in RFID readers in accordance with embodiments of the invention are discussed further below.

Following filtering of the intermediate frequency signal 704 by the ceramic band pass filters, the filtered signal remains in FSK format and still requires demodulation in order to recover the binary data. Any of the previously identified demodulation methods including but not limited to use of a ratio detector, a discriminator, a quadrature detector, and/or a PLL can be utilized for this purpose. In many embodiments, the RFID reader includes a microcontroller device that can be utilized to perform FSK demodulation, eliminating the cost and alignment associated with a dedicated demodulation circuit. In the process illustrated in FIG. 7, the intermediate frequency signal 704 is converted to a digital logic compatible intermediate frequency 707. In the illustrated embodiment, the lower intermediate frequency 707 is 56.25 KHz and is obtained by dividing the FSK frequency 704 by a factor of 8. The signal frequency division results in FSK frequencies of 56.9 KHz and 55.6 KHz centered at 56.25 KHz. Although a specific frequency is shown in FIG. 7, alternative processes that do not involve the down mixing of the upwardly mixed intermediate frequency or that involve mixing the upwardly mixed intermediate frequency signal to another frequency appropriate to a specific FSK demodulation process can be utilized in accordance with embodiments of the invention.

Ceramic Filters

Figure 8:
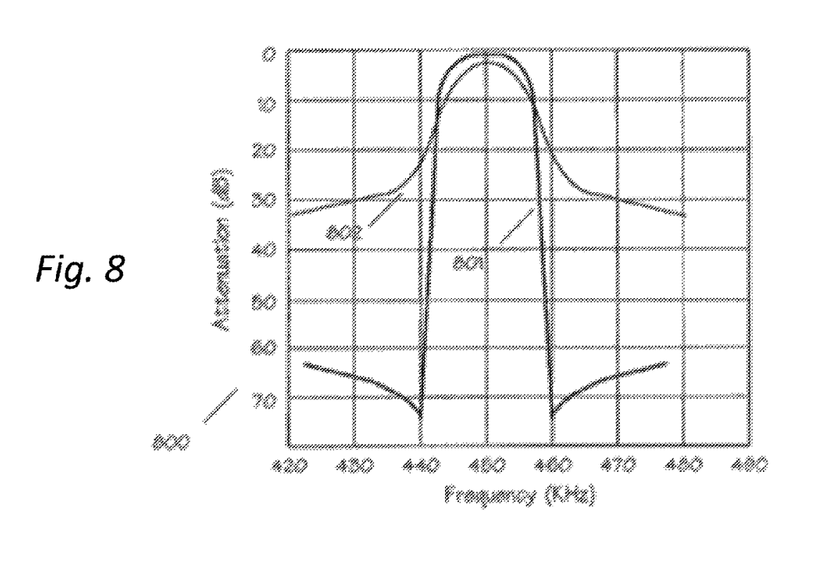
FIG. 8 illustrates the pass-band characteristic of a ceramic filter compared to that of a conventional passive bandpass filter.

The bandpass response curve of a ceramic filter is compared to that of a conventional passive filter in the graph shown in FIG. 8. The graph 800 includes the bandpass response of a typical ceramic filter 801 of the type that can be utilized in RFID readers in accordance with embodiments of the present invention. When compared to the bandpass response of a typical inductor-capacitor (LC) filter 802, the ceramic filter exhibits a pass-band that is wider and flatter than that of the conventional LC filter, and a stop-band that has much greater attenuation than that of the LC filter. Ceramic filters achieve this superior characteristic by cascading several ceramic elements and stagger tuning their resonant frequencies. Replicating this with manually adjustable inductor coils in a filter network comprising multiple L-C pairs, while technically possible, can present an impracticable tuning and alignment task.

Several companies, notably Murata North America, Inc. of Smyrna, Ga. and Toko America, Inc. of Mt. Prospect, Ill. manufacture ceramic filter components that are suitable for use in RFID readers in accordance with embodiments of the invention. For example, Murata part number CFWKA450KDFA is a 6 element bandpass filter having a 450 KHz center frequency and a 6 dB bandwidth of +/−10 KHz. Toko part number ELFY450D has similar specifications. Both are surface mount style components measuring approximately 12 mm×7 mm×3 mm. Other manufacturers and other part numbers may exhibit advantageous performance in particular embodiments of the present invention.

Low Noise Mixers

Figure 9A:
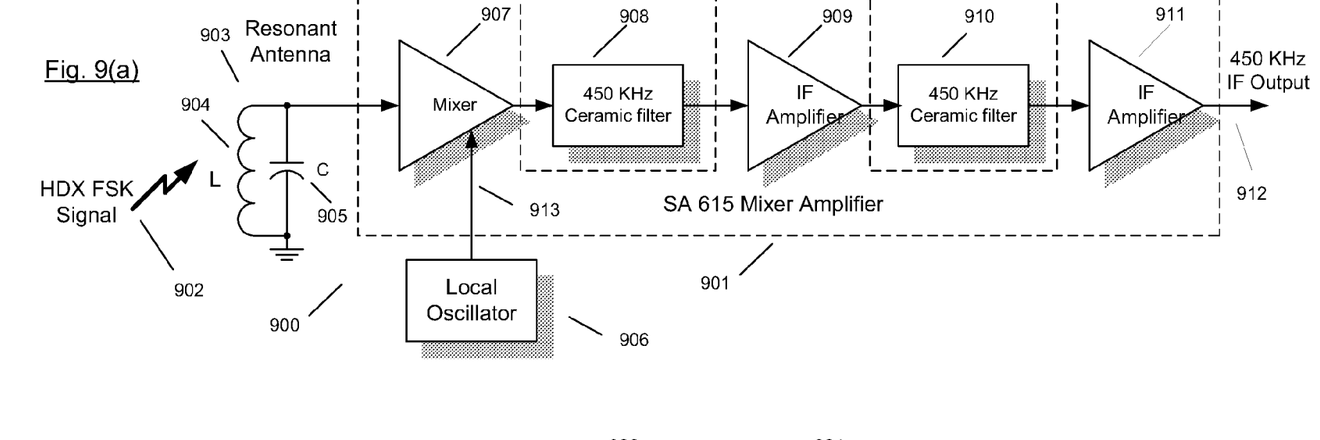

The filtering of ISO HDX FSK signals using ceramic filters in accordance with embodiments of the invention can be performed using a low noise mixer that incorporates one or more ceramic filters. A low noise mixer in accordance with an embodiment of the invention is illustrated in FIG. 9(a). The low noise mixer 900 receives an HDX FSK signal 902 captured using a resonant circuit 903, which typically includes at least an inductor L 904 and a capacitor C 905. In many embodiments, the inductor L 904 is an air coil or ferrite core structure that couples effectively with the HDX transponder's magnetic field. Although a specific resonant antenna is illustrated, any form of resonant antenna appropriate for use in the reception of signals from an HDX transponder can be utilized in accordance with embodiments of the invention. The low noise mixer 900 includes a series of cascaded amplifiers and ceramic filters, which can be constructed from discrete components or integrated circuits.

The low noise mixer 901 includes a mixer circuit 907 and IF amplifier stages 909 and 911. Two ceramic filters 908 and 910 of the type previously described connect the mixer circuit 907 to the input of a first IF amplifier stage 909, and connect the output of first IF amplifier stage 909 to the input of a second IF amplifier stage 911. A local oscillator 906 provides the heterodyning frequency 913 (either 579.2 KHz or 320.8 KHz) to the mixer stage 907. The output 912 of the second IF amplifier 911 is a greatly amplified and aggressively band-pass filtered HDX FSK data signal whose output frequencies are depicted in FIG. 7 as 704, 705, and 706.

The local oscillator frequencies identified above utilized in the upward mixing of the HDX FSK signal are ideal frequencies that center the upwardly mixed HDX FSK signal at 450 KHz. In practice, the local oscillator frequency can deviate from these ideal frequencies, as long as the resulting FSK signal remains suitably within the pass-band of the ceramic filters. For example, when the local oscillator is derived from a microcontroller, the closest possible frequency might deviate by several hundred hertz due to the microcontroller's crystal frequency and internal timing circuit constraints, but such deviation is within an acceptable margin. Accordingly, the low noise mixer illustrated in FIG. 9(a) is not as susceptible to tuning as many conventional RFID reader architectures.

Although a specific low noise mixer for upwardly mixing and filtering an ISO HDX FSK signal using at least one ceramic filter is illustrated in FIG. 9(a), a variety of circuits can be utilized to upwardly mix and then filter an ISO HDX FSK signal using at least one ceramic bandpass filter in accordance with embodiments of the invention. Additional circuits that can be used to mix and filter ISO HDX FSK signals using at least one ceramic filter and the demodulation of the IF output of a low noise mixer in accordance with embodiments of the invention are discussed further below.

RFID Readers Incorporating Low Noise Mixers

Figure 9B:
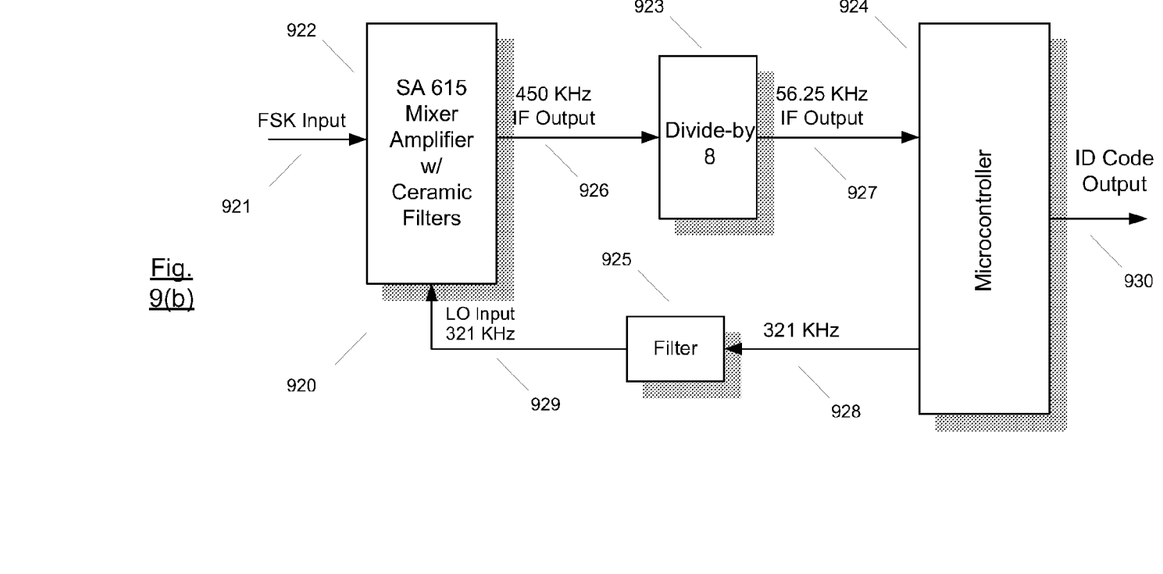

As noted above, the filtered intermediate frequency FSK signal produced using a system such as the low noise mixer illustrated in FIG. 9(a) can be demodulated using any of a variety of conventional demodulation techniques. An RFID reader incorporating a low noise mixer and configured to demodulate the IF output of the low noise mixer in accordance with an embodiment of the invention is illustrated in FIG. 9(b). The RFID reader 920 incorporates a low noise mixer 922, which is an implementation of the low noise mixer 901 shown in FIG. 9(a) using a SA615 Mixer FM IF System manufactured by NXP Semiconductors, Inc. of Eindhoven, in the Netherlands and ceramic filters 922.

Figure 10:
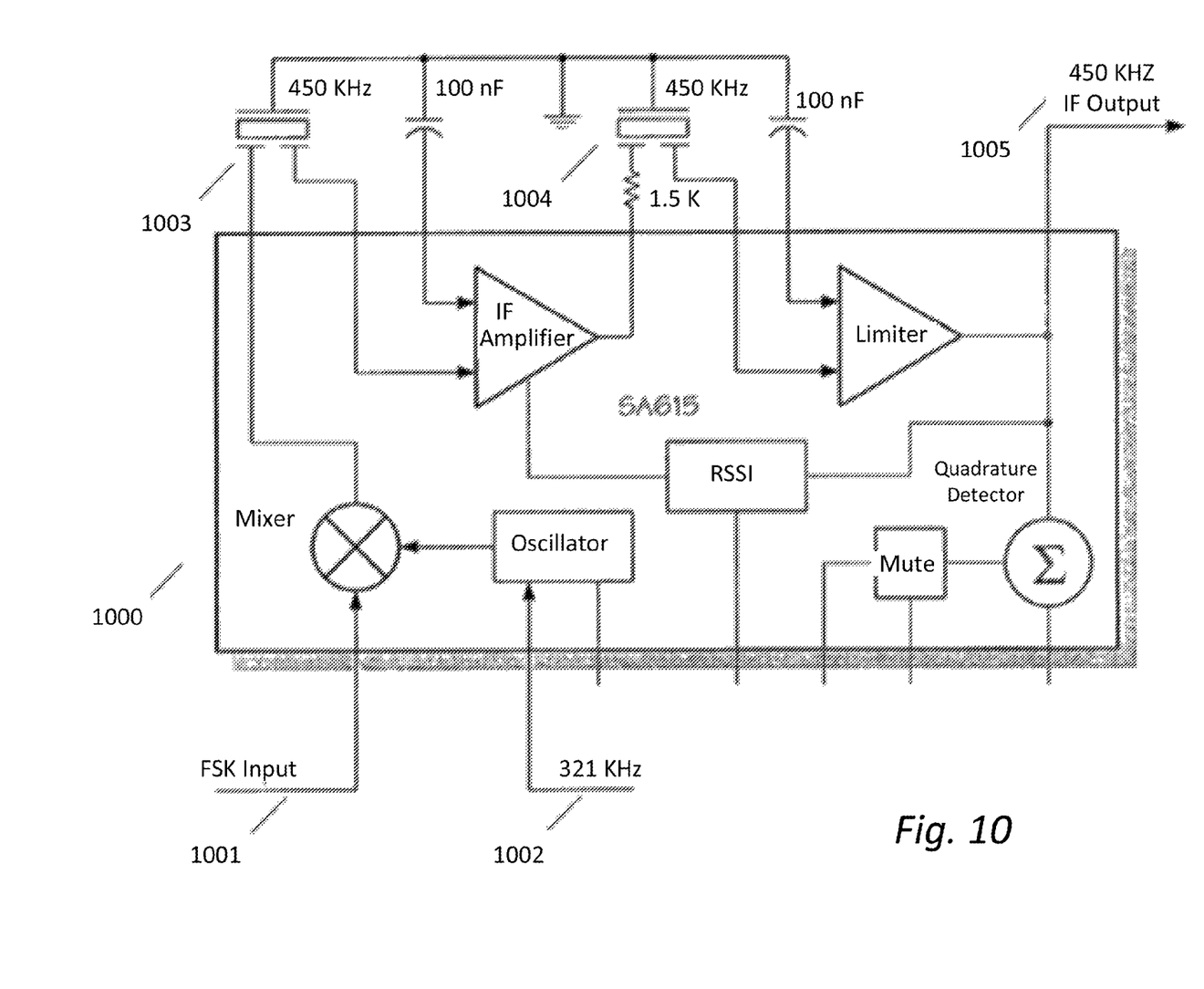
FIG. 10 illustrates a circuit diagram of a low noise mixer in accordance with an embodiment of the invention.

The use of a SA615 Mixer FM IF System to implement a low noise mixer in accordance with an embodiment of the invention is illustrated in FIG. 10. Two ceramic filters 1003, and 1004 are used to filter inputs to first and second IF amplifiers within the SA615 chip 1000. The HDX FSK input signal 1001 and local oscillator input 1002 are applied to the mixer input and oscillator inputs of the SA615 chip, and an approximately 450 KHz IF output 1005 appears at the output of the second IF amplifier. Additional application details are contained in the SA615 data specification published by NXP Semiconductor, Inc., the contents of which are incorporated herein by reference.

Referring back to FIG. 9(b), an ISO HDX FSK input signal (921) can be provided to the low noise mixer 922 by a resonant antenna. As discussed above, the low noise mixer 922 outputs approximately a 450 KHz IF signal (926), and utilizes a local oscillator input (929) to mix the FSK signal to the IF center frequency. In the illustrated embodiment, the local oscillator input is generated using a microcontroller output (928) that is approximately 320.8 KHz (928). The output of the microcontroller is a digital waveform, which is filtered by filter 925 to attenuate harmonics and provide an approximately sinusoidal input (929) to the low noise mixer 922. As previously specified, this local oscillator frequency may deviate slightly from the ideal frequency, and remain acceptable.

The approximately 450 KHz IF output (926) of the low noise mixer is provided to a digital divider 923, such as but not limited to a 74HC4060 14-Stage Binary Ripple Counter with Oscillator, a standard digital logic IC available from several semiconductor manufacturers. The digital divider 923 converts the analog waveform of the IF output signal (926) to a digital logic compatible 56.25 KHz IF output (927), by dividing the FSK frequencies by a factor of 8. As noted above, this signal frequency division results in FSK frequencies of approximately 56.9 KHz and 55.6 KHz centered at approximately 56.25 KHz. This IF output signal (927) is applied to an input on the microcontroller. Using methods known to those of skill in the art, this input signal is measured to determine when the input signal is 56.9 KHz or 55.6 KHz. Such methods can determine the time duration of pulses by gating a high frequency reference signal with the FSK signal. For example, if a 10 MHz reference signal is gated using 56.9 KHz, 88 reference frequency cycles are counted during one-half of the 56.9 KHz period, and 90 reference frequency cycles are counted during one-half of the 55.6 KHz period. Accordingly, the microcontroller performs the FSK demodulation process, by assigning bit value 0 to the data when 56.9 KHz is measured, and assigning bit value 1 to the data when 55.6 KHz is measured. The demodulated data is subsequently output in a format useful to the RFID reader's use as ID Code output (930).

Waveforms During Transmission and Demodulation of FSK Data

Figure 11A:
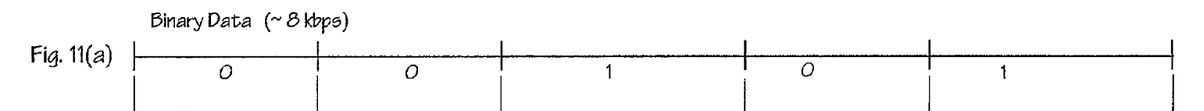
Figure 11B:
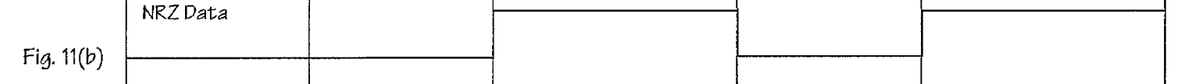
Figure 11C:
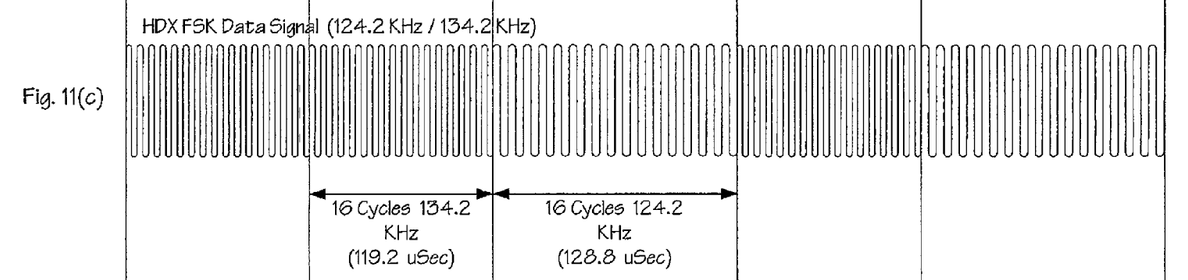
Figure 11D:
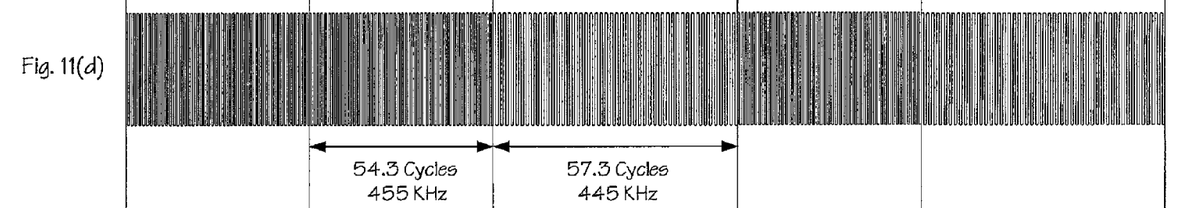
Figure 11E:
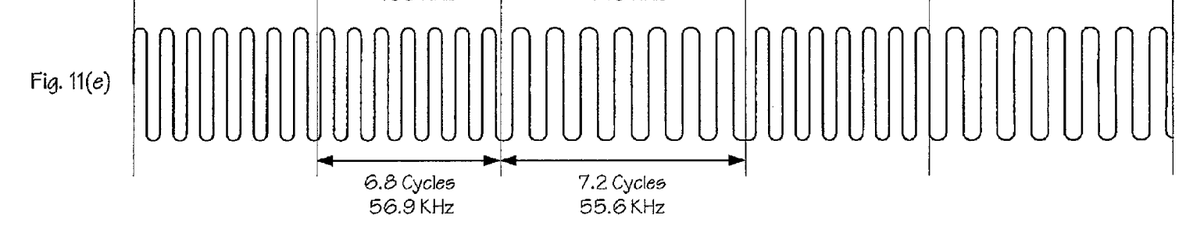

FIGS. 11(a)-11(e) illustrate waveforms associated with the heterodyning signal processing utilized by the RFID reader illustrated in FIG. 9(b) and by other RFID readers in accordance with embodiments of the invention. FIGS. 11(a), (b), and (c) reproduce the waveforms illustrated in FIGS. 3(b1) through 3(b3) for convenience. When the HDX FSK signal shown in FIG. 11(c) is mixed with a local oscillator signal as previously described, and then filtered with a 450 KHz band-pass filter, the waveform shown in FIG. 11(d) results, and it is that signal which appears at the 450 KHz IF output 912 of the low noise mixer in FIG. 9(a). The IF output includes FSK frequencies of approximately 455 KHz and 445 KHz in place of frequencies 134.2 KHz and 124.2 KHz, respectively. When divided by 8, the FSK frequencies become approximately 56.9 KHz and 55.6 KHz as shown in FIG. 11(e), which can be provided to a microcontroller for demodulation.

Although the present invention has been described in certain specific aspects, variations to the embodiments presented herein are possible without departing from the spirit and scope of the present invention. Different ceramic filter frequencies can be used, different local oscillator frequencies can be used, alternate mixer and IF amplifiers can be used, different methods of FSK demodulation can be used, and other variations known to those of ordinary skill in the art can be implemented while still practicing the invention covered in the following claims. Thus, embodiments of the present invention should be considered in all respects as illustrative and not restrictive.

What is claimed is:

1. A process for demodulating a low frequency half-duplex (HDX) frequency shift keying (FSK signal, comprising:
    receiving the HDX FSK signal using a resonant antenna, where the HDX FSK signal comprises a plurality of HDX FSK signal frequencies distributed around a center frequency nominally at mid-point between the lowest and highest HDX FSK signal frequencies;
    upwardly mixing the HDX FSK signal to an intermediate frequency FSK signal having a center frequency higher than the center frequency of the received HDX FSK signal by mixing the HDX FSK signal with a fixed local oscillator frequency;
    filtering the intermediate frequency FSK signal using at least one ceramic bandpass filter, wherein the at least one ceramic bandpass filter has a 6 dB bandwidth of at least +/−10 KHz centered at the intermediate frequency; and
    demodulating the filtered intermediate frequency FSK signal to produce a binary output;
    wherein the HDX FSK signal frequencies are 134.2 KHz and 124.2 KHz.

2. The process of claim 1, wherein filtering the intermediate frequency FSK signal using at least one ceramic bandpass filter comprises:
    filtering the intermediate frequency FSK signal using a first ceramic bandpass filter;
    providing the filtered signal to a first intermediate frequency amplifier;
    filtering the output of the first intermediate frequency amplifier with a second ceramic bandpass filter; and
    providing the output of the second ceramic bandpass filter to a second intermediate frequency amplifier.

3. The process of claim 1, wherein demodulating the filtered intermediate frequency FSK signal to produce a binary output comprises:
    reducing the frequency of the filtered intermediate frequency FSK signal using a frequency divider; and
    providing the reduced frequency filtered FSK signal to a microcontroller configured to demodulate the reduced frequency FSK signal and detect binary data.

4. The process of claim 1, wherein the HDX FSK frequencies are upwardly mixed to a center frequency of 450 KHz.

5. The process of claim 1, wherein the at least one ceramic bandpass filter has a 6 dB width of at least +/−10 KHz on either side of the center frequency of the intermediate frequency signal HDX FSK signal further comprises a data rate of approximately 8 KHz.

6. The process of claim 5, wherein the at least one ceramic bandpass filter has a 6 dB bandwidth of at least +/−13 KHz on either side of the center frequency of the intermediate frequency FSK signal.

7. An RFID receiver, comprising:
    a resonant antenna configured to receive a half-duplex (HDX) frequency shift keying (FSK) signal from a transponder, where the HDX FSK signal comprises a set of HDX FSK signal frequencies distributed around a center frequency nominally at mid-point between the lowest and highest HDX FSK signal frequencies;
    a mixer configured to upwardly mix an FSK signal received via the resonant antenna to an intermediate frequency FSK signal having a center frequency higher than the center frequency of the received FSK signal using a local oscillator frequency, where the local oscillator is a fixed frequency local oscillator;
    at least one ceramic filter configured to bandpass filter the intermediate frequency FSK signal, wherein the at least one ceramic filter has a 6 dB bandwidth of at least +/−10 KHz centered at the intermediate frequency;
    at least one intermediate frequency amplifier configured to amplify the filtered frequency intermediate FSK signal; and
    a demodulator configured to demodulate the filtered intermediate frequency FSK signal and detect binary data;
    wherein the resonant antenna is configured to receive HDX FSK signal frequencies of 134.2 KHz and 124.2 KHz.

8. The RFID receiver of claim 7, wherein:
    a first ceramic filter is configured to receive the intermediate frequency FSK signal from the mixer, where the first ceramic filter includes an output connected to the input of a first intermediate frequency amplifier;
    a second ceramic filter is configured to receive an intermediate frequency FSK signal from the first intermediate frequency amplifier, where the second ceramic filter includes an output connected to the input of a second intermediate frequency amplifier; and
    the second intermediate frequency amplifier is configured to provide the filtered intermediate frequency FSK signal to the demodulator.

9. The RFID reader of claim 7, wherein:
    the demodulator comprises:
    a microcontroller; and
    a frequency divider configured to reduce the frequency of the FSK demodulator to a lower intermediate frequency and to provide the lower intermediate frequency FSK signal to the microcontroller;
    wherein the microcontroller is configured to demodulate the lower intermediate frequency FSK signal to detect binary data; and
    the mixer is configured to use a local oscillator frequency generated using the microcontroller to upwardly mix the HDX FSK signal received via the resonant antenna.

10. The RFID reader of claim 7, wherein the HDX FSK frequencies are upwardly mixed to a center frequency of 450 KHz.

11. The RFID reader of claim 7, wherein the at least one ceramic filter has a 6 dB width of at least +/−10 KHz on either side of the center frequency of the intermediate frequency signal HDX FSK signal further comprises a data rate of approximately 8 KHz.

12. The RFID reader of claim 11, wherein the at least one ceramic filter has a 6 dB bandwidth of at least +/−13 KHz on either side of the center frequency of the intermediate frequency FSK signal.

* * * * *

UNITED STATES PATENT AND TRADEMARK OFFICE
CERTIFICATE OF CORRECTION

PATENT NO.      : 8,811,542 B2
APPLICATION NO. : 12/902910
DATED           : August 19, 2014
INVENTOR(S)     : Leigh Bateman It is certified that error appears in the above-identified patent and that said Letters Patent is hereby corrected as shown below:

In the Claims

Claim 1, col. 11, line 22, add ")" after FSK;

Signed and Sealed this
Twenty-first Day of October, 2014

Michelle K. Lee
*Deputy Director of the United States Patent and Trademark Office*